3,380,561
HYDRAULIC LOCKING DEVICE
Clyde R. Porter, 1737 Roscomare Road,
Los Angeles, Calif. 90024
Filed Nov. 14, 1966, Ser. No. 594,205
4 Claims. (Cl. 188—96)

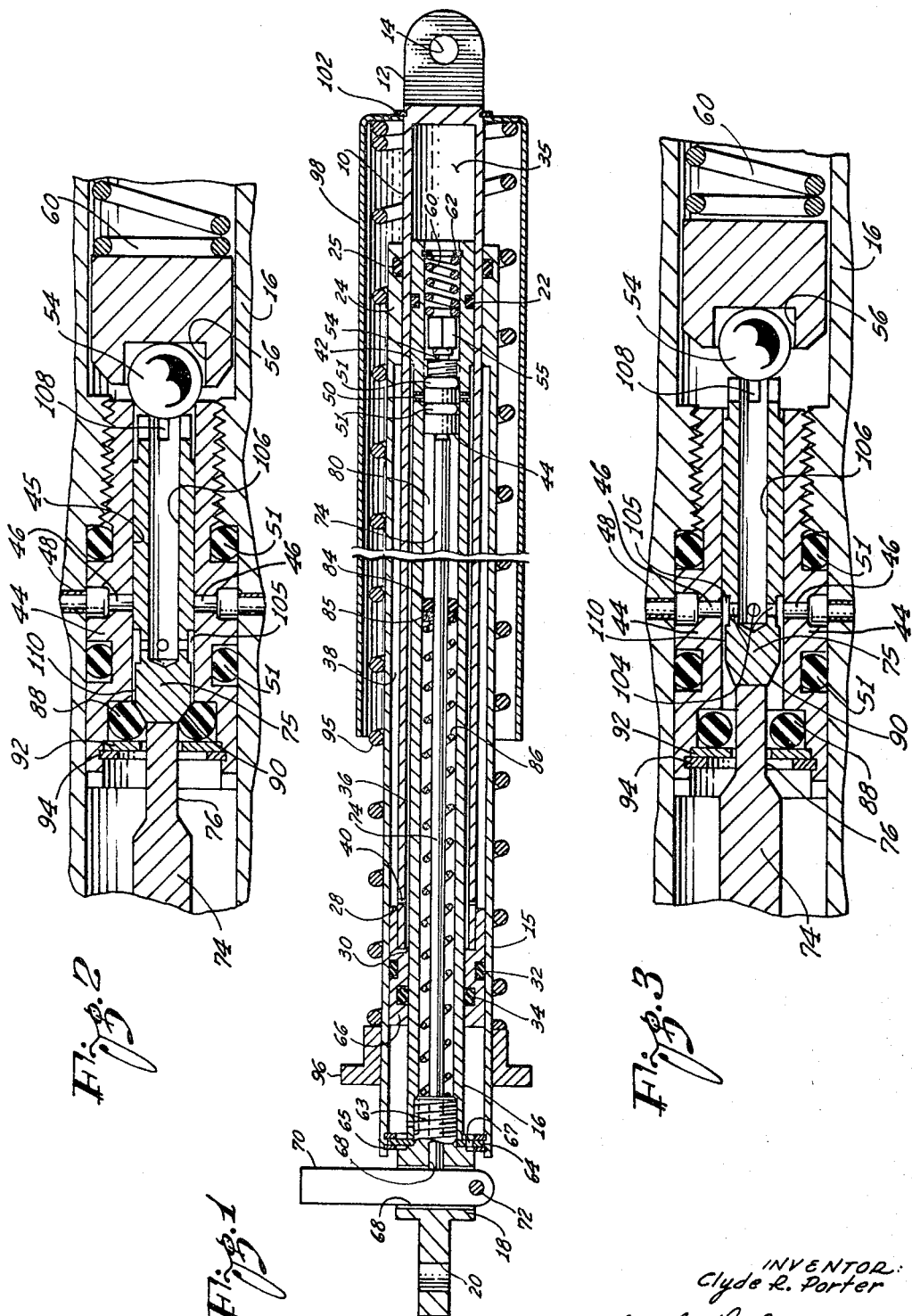

ABSTRACT OF THE DISCLOSURE

This invention relates to a hydraulic locking device that is adapted to extend and contract to hold two relatively movable members at selected positions relative to each other by means of fluid trapped on opposite sides of a piston slidably carried by one member and fixed to the other member. Manually operated valve means in the piston control fluid flow through radial and axial passages in said piston.

A typical hydraulic locking device of the type to which the invention pertains comprises a cylinder confining a quantity of hydraulic fluid and a piston dividing the cylinder into two hydraulic chambers, the piston being mounted on a piston rod that extends through both of the two opposite ends of the cylinder.

What may be termed a locking valve controls communication between the two chambers and is normally closed to immobilize the piston. Space is also provided to function as a reservoir for replenishing fluid in communication with at least one of the two hydraulic chambers, the reservoir being adapted to expand and contract to accommodate thermal expansion and contraction of the fluid in the two hydraulic chambers.

Devices of this type are disclosed in the Porter Patent 3,051,274 issued Aug. 28, 1962, and the Porter Patent 3,177,981 issued Apr. 13, 1965, which two patents are hereby incorporated into the present disclosure by reference.

The Porter hydraulic locking devices which are widely used for control of tiltable back rests of reclining chairs in passenger aircraft are characterized by a locking valve in the form of a valve ball that it normally seated by spring pressure. For the purpose of changing the inclination of the back rests, a manual operating rod is employed to unseat the valve ball in opposition to the spring pressure. The valve ball functions as a positive valve to resist a rearwardly inclined back rest.

If desired, the maintenance personnel may erect a seat simply by pushing the back rest to a forward erect position without bothering to open the locking valve, the resulting rise in the fluid pressure serving to unseat the valve ball. Since the valve ball functions as a check valve, however, the back rest can be returned to its recline position only by manually unseating the valve ball.

The capability of the back rest to override the closed valve ball for forward inclination of the back rest is desirable for convenience in a passenger seat. In a seat for a member of the crew of an aircraft, however, the locking valve should be constructed to preclude any overriding action in either direction. In other words, in a seat for a member of the crew of an aircraft, especially a military aircraft, the closed valve should act in a positive manner to resist forward and rearward movement of the back rest in the absence of manual operation of the valve. If the locking valve is not positive in its action, the back rest might yield in a manner and at a time to interfere seriously with the duties of the crewman. For example, the inertia of the occupant's body might cause the back rest to yield at an inappropriate time in response to acceleration forces.

The present invention is directed to the problem of modifying a Porter hydraulic locking device in a simple manner to convert the hydraulic locking device from yielding action to positive locking action. The modification should be simple to avoid the necessity of manufacturing two different hydraulic locking devices, one for passenger seats and the other for crew seats. In this regard a feature of the invention is that the conversion from a yielding type hydraulic locking device to a positive type is accomplished simply by substituting one small slidable member for another small slidable member.

The slidable member in a hydraulic locking device for a passenger seat has three different functions, namely, to transmit pressure from an operating rod to the valve ball to unseat the valve ball, to function as a check valve for the replenishing reservoir of hydraulic fluid, and to restrict the flow of the hydraulic fluid out of the reservoir. The slidable member substituted by the present invention has these same functions and the additional function of serving as a slide valve to provide positive locking action.

A feature of the invention is the manner in which the slide valve cooperates with the valve ball to provide the positive locking action. The slidable valve cooperates with radial ports to block flow in one direction between the two chambers and the valve ball cooperates with its seat to block flow in the other direction. In the absence of the valve ball, the sleeve valve would be vulnerable to overriding fluid pressure in the opposite direction. Working together, however, each protects the other from overriding fluid pressure with consequent locking action in both directions.

The various features and advantages of the invention will be apparent from the following detailed description and the accompanying drawings.

In the drawings, which are to be regarded as merely illustrative:

FIG. 1 is a longitudial sectional view of the presently preferred embodiment of the invention;

FIG. 2 is an enlarged fragmentary section of the locking valve arrangement employed in the device, the parts of the locking valve being in their normal position for positive prevention of flow between the two hydraulic chambers of the device; and FIG. 3 is a view similar to FIG. 2 showing the valve parts in their alternate positions to permit free flow between the two hydraulic chambers of the device.

Referring to FIG. 1, the selected embodiment of the invention comprises two telescoping structures for attachment respectively to two members for controlling the spacing between the two members. In a reclining chair, one member is the tiltable back rest and the other member is a fixed portion of the chair construction. One of the two structures shown in FIG. 1 is a single cylinder 10, having an integral ear 12 at its outer end with an aperture 14 in the ear to receive a screw or the like for attaching the structure to one of the two members. The other structure comprises an outer cylinder 15 and an inner cylinder 16, both of which are connected to an end fitting 18 that has an aperture 20 to receive a screw or the like for attachment to the other of the two members.

The inner cylinder 16 slidingly telescopes into the single cylinder 10 and is provided with a circumferential O-ring 22 at its inner end for sealing contact with the single cylinder. The outer cylinder 15 is formed with an inner circumferential step 24 at its inner end, and this step is provided with an inner circumferential O-ring 25 in sealing contact with the outer circumference of the single cylinder 10. The single cylinder 10 is formed at its inner end with an outer circumferential step 28 and an inner circumferential step 30, the outer circumferential step carrying a circumferential O-ring 32 in sliding sealing contact with the inner surface of the outer cylinder 15 and the inner circumferential step carrying an inner circumferential O-ring 34 in sliding sealing contact with the periphery of the inner cylinder 16. As indicated in the drawing, the two steps 28 and 30 are parts of an annular piston mounted on the end of the single cylinder 10.

As heretofore stated, a locking device of this type has two separate hydraulic chambers with normally closed valve means to control flow between the two chambers. In this embodiment of the ivention, one of the two chambers 35 is formed by the single cylinder 10 and the inner end of the inner cylinder 16. The other of the two chambers comprises a pair of concentric annular compartments 36 and 38 which are interconnected by a plurality of radial bores 40 in the wall of the single cylinder 10. The outer annular compartment 38 is defined by the outer cylinder 15, the inner circumferential step 24 of the outer cylinder, the single cylinder 10, and the outer circumferential step 28 of the single cylinder. The other inner annular compartment 36 is defined by the single cylinder 10, the inner circumferential step 30 of the single cylinder, the outer surface of the inner cylinder 16, and an outer circumferential step 42 on the inner end of the inner cylinder.

Fluid flow between the hydraulic chamber 35, on the one hand, and the two interconnected concentric chambers 36 and 38, on the other hand, is controlled by valve means associated with a cylindrical valve body 44 that is mounted in the inner end of the inner cylinder 16. The valve body 44 has an axial bore or passage 45 throughout its length intersected by two radial bores 46 which register with two corresponding radial bores 48 in the wall of the inner cylinder 16. A pair of O-rings 51 on the opposite sides of the radial bores 46 prevent leakage flow along the periphery of the valve body 44.

The end of the axial passage 45 of the valve body 44 that is directed towards the hydraulic chamber 35 forms a valve seat 52 for a valve member in the form of a ball 54. The ball 54 is guided by a floating cage in the form of a block 55 that has a cylindrical recess 56 for engagement with the ball. The block or ball cage 55 is of hexagonal cross-sectional configuration to provide six clearance spaces for fluid flow longitudinally past the valve cage. To bias the valve ball 54 to its closed position, a relatively heavy coil spring 60 is confined under compression between the block 55 and a snap ring 62 that is anchored in the end of the inner cylinder 16. It is apparent that dislodging the valve ball 54 from the valve seat 52 places the hydraulic chamber 35 in communication with the two concentric compartments 36 and 38.

The valve ball 54 is controlled by operating rod means that extends axially through the inner cylinder 16 from the end fitting 18. As shown in FIG. 1, the end fitting 18 has a nipple portion 63 which is threaded into the end of the inner cylinder 16. For the purpose of fixing the outer cylinder 15, the end fitting 18 clamps a washer 64 against the end of the inner cylinder 16, and this washer is engaged from its opposite sides by a pair of snap rings 65 that seat in corresponding inner circumferential grooves of the outer cylinder 15. A vent to the atmosphere from the annular space 66 may be in the form of one or more apertures 67 in the washer 64.

The end fitting 18 has an axial bore 68 which communicates with the interior of the inner cylinder 16, and the end fitting is further formed with a transverse aperture 69 to accommodate a transverse control lever 70 which is mounted on a pivot 72.

The operating rod means for unseating the normally seated valve ball 54 comprises a long axial rod 74 which extends from the operating lever 70 to the valve body 44 and a short axial slide member 75 which is housed in the axial passage 45 of the valve body 44. As shown in FIG. 2, the axial rod 74 may be formed with an end portion 76 of reduced diameter for abutment against the end of the slide member 75. It is apparent that rotation of the control lever 70 will result in screw action to displace the long axial rod 74 and the slidable member 75 to the right as viewed in FIG. 2 to dislodge the ball 54 from its seat as shown in FIG. 3 thereby to permit free flow between the hydraulic chamber 35 and the other hydraulic chamber, i.e., the two annular compartments 36 and 38, as required for free extension or contraction of the hydraulic device.

The interior of the inner cylinder 16 forms a hydraulic fluid reservoir 80 which is of annular configuration by virtue of the presence of the axial rod 74. One end of the reservoir 80 is defined by a floating gland comprising an O-ring 84 slidingly embracing the axial rod 74 and an annular spring seat 85 abutting the O-ring. The fluid in the reservoir 80 is maintained under constant pressure by a coil spring 86 which is confined under compression between the spring seat 85 and the nipple portion 63 of the end fitting 18.

The second end of the annular fluid reservoir 80 is defined by a check valve shown in FIG. 2, the check valve comprising an O-ring 88 and a tapered end or conical shoulder 90 of slide member 75. The O-ring 88 is confined by a back-up ring 92, which, in turn is retained by a snap ring 94.

If the device is to be used to control a tiltable back rest of a reclining chair, it is desirable to add a suitable counterbalance spring. For this purpose a heavy coil spring 95 may surround the outer cylinder 15 to resist longitudinal contraction of the device. One end of the spring abuts an annular member 96 that is fixedly mounted on the outer cylinder 15. The other end of the coil spring extends into a cylindrical guard 98 in abutment with the end wall of the guard. The end wall of the guard may abut a suitable snap ring 102.

As described to this point, the structure is identical to the structure disclosed in the Porter Patent 3,177,981, except that in the patent disclosure the slide member is of a different configuration and is smaller in cross section throughout its length than surrounding bore or passage 45 to permit free flow past the slide member to the valve ball 54. In accord with the teaching of the present invention, the present slide member 75 is shaped and dimensioned to serve as a longitudinally reciprocative slide valve which, as shown in FIG. 2, normally cuts off between the two chambers of the device and is nonresponsive to radially inward flow from the chamber comprising the two annular compartments 36 and 38.

As indicated in FIG. 2 the slide valve 75 has radial bores 104 and a corresponding circumferential groove 105 to cooperate with the two radial bores 46 and the slide member is further provided with an axial bore 106 that places the diametrical bore 104 in communication with the valve ball 54. The end of the slide valve 75 that abuts the valve ball 54 is formed with slots 108 to permit flow past the valve ball and past the periphery of the ball cage 55 for communication between the two chambers of the device, i.e., between the chamber 35 in the cylinder 10 and the chamber comprising the two concentric annular compartments 36 and 38.

As heretofore stated, the conical shoulder 90 at the end of the slide valve 75 cooperates with the O-ring 88 to function as a check valve for replenishing flow from the fluid reservoir 80, and as may be seen in FIG. 2, the end of the slide valve 75 is slightly reduced in diameter to form an annular passage 110 for restricted flow from the check valve to the diametrical bore 104 of the slide valve for replenishing flow to the two chambers of the device.

Under normal static conditions, the coil spring 60 holds the valve ball 54 firmly on its seat and the coil spring acting through the valve ball 54 holds the slide valve in its normal closed position, the check valve being closed, i.e., the tapered end 90 of the slide valve 75 compressing and deforming the O-ring 88 to cut off the fluid reservoir 80. If the operating rod 74 is only slightly moved to the right as viewed in FIG. 2 to unseat the valve ball 54 only slightly, the check valve is opened to place the fluid reservoir 80 in restricted communication with the chamber 35 in the cylinder 10. If the operating rod 74 is moved further to the right to shift the slide valve 75 until its circumferential groove 106 registers with the fixed radial bores 46, the reservoir is placed in communication with both of the two chambers of the device.

While the parts are in their normal static positions the slide valve 75 cuts off flow between the chamber 35 and the other chamber comprising the two concentric annular compartments 36 and 38. Obviously the slide valve 75 at its normal closed position is nonresponsive to the pressure in the two annular compartments 36 and 38. On the other hand the slide valve would open in response to rise in pressure in the chamber 35 if it were not cut off from the pressure by the seated valve ball 54. In like manner, the seated valve ball 54 cuts off flow from the chamber 35 and merely seats more tightly in response to rise in pressure in the chamber 35. On the other hand, the valve ball 54 would open in response to fluid pressure from two concentric compartments 36 and 38 if it were not cut off from such pressure by the slide valve 75. Thus the valve ball 54 and the slide valve 75 complement each other for the purpose of normally positive locking action against either extension or contraction of the device. Unlocking the device requires merely displacement of the slide valve 75 by the operating rod 74 until the circumferential groove 105 of the slide valve registers with the two fixed radial bores 46, the slide valve thereby unseating the valve ball 54.

My description in specific detail of the selected embodiment of the invention will suggest various changes, substitutions, and other departures from my disclosure within the spirit and scope of the appended claims.

I claim:

1. In a hydraulic locking device of the character described wherein two opposed chambers are interconnected by a longitudinal passage communicating with one chamber and an intersecting radial passage communicating with the other chamber, with a spring-pressed valve member normally closing the longitudinal passage and wherein manually operable means is provided to unseat the valve member, the improvement comprising:

a slide valve in said longitudinal passage interposed between said manually operable means and the valve member to transmit operating force to the valve member, said slide valve having a normal locking position at which the valve member is seated and being movable to a release position to unseat the valve member, said slide valve having a radial port to register with said radial passage at the release position of the slide valve and having a longitudinal passage in communication with the radial port to cooperate therewith to place the two chambers in communication with each other when the valve member is unseated;

whereby normally the seated valve member positively prevents flow from said one chamber to said other chamber and the slide valve positively prevents flow from said other chamber to said one chamber.

2. In a hydraulic locking device of the character described having two opposed fluid chambers interconnected by a longitudinal passage communicating with one chamber and a radial passage communicating with the longitudinal passage and with the other chamber, with a spring-pressed valve member normally closing the longitudinal passage and with manually operable means to unseat the valve member, said hydraulic locking device further having a fluid reservoir with a check valve seat in said longitudinal passage and a check valve normally seated in the check valve seat to cut off the fluid reservoir, the improvement comprising:

a slide member in said longitudinal passage, one end of the slide member being shaped and dimensioned to serve as said check valve, the remainder of the slide member being shaped and dimensioned to serve as a slide valve to open and close said radial passage, the pressure from the said valve member normally holding said slide valve and said check valve at their closed positions, said manually operable means extending through said reservoir to said slide valve to displace the slide valve to open the radial passage and thereby to displace the valve member to open the longitudinal passage for free communication between the two chambers.

3. A hydraulic locking device of the character described having in combination:

a piston to control extension and contraction of the device;

structure forming a first chamber to receive fluid displaced by axial movement of the piston on one direction;

structure forming a second chamber to receive fluid displaced by axial movement of the piston in the opposite direction, said piston having passages therein for communication between the two chambers including a radial passage for communication with one of the two chambers and an axial passage for communication with the other of the two chambers;

a slide valve in said piston normally cutting off the radial passage;

a valve member cooperative with said longitudinal passage;

spring means normally pressing said valve member into a seat to cut off said longitudinal passage; and manually operable means to displace said slide valve longitudinally from its normal position against said valve member to unseat the valve member and to open said radial passage for fluid flow between the two passages.

4. A combination as set forth in claim 3 which includes structure forming a fluid reservoir and which includes a check valve normally cutting off the fluid reservoir, said check valve being interposed between said manually operating means and said slide valve, said spring means acting through said valve member and slide valve to normally keep the check valve closed.

References Cited

UNITED STATES PATENTS

| 3,177,981 | 4/1965 | Porter | 251—334 X |
| 3,228,632 | 1/1966 | Hunth. | |
| 3,315,768 | 4/1967 | Stuhler et al. | 188—67 |
| 3,318,426 | 5/1967 | Forster | 188—67 X |

MILTON BUCHLER, *Primary Examiner.*

GEORGE E. HALVOSA, *Examiner.*